United States Patent
Furman et al.

(10) Patent No.: US 9,047,613 B2
(45) Date of Patent: Jun. 2, 2015

(54) JOINING MULTIPLE USER LISTS

(75) Inventors: Vadim Furman, San Jose, CA (US);
Rajas Moonka, San Ramon, CA (US);
Anurag Agarwal, Sunnyvale, CA (US)

(73) Assignee: Google Inc., Mountain View, CA (US)

(*) Notice: Subject to any disclaimer, the term of this patent is extended or adjusted under 35 U.S.C. 154(b) by 8 days.

(21) Appl. No.: 13/221,530

(22) Filed: Aug. 30, 2011

(65) Prior Publication Data
US 2012/0059809 A1    Mar. 8, 2012

Related U.S. Application Data

(60) Provisional application No. 61/379,281, filed on Sep. 1, 2010.

(51) Int. Cl.
*G06F 7/00* (2006.01)
*G06Q 30/02* (2012.01)

(52) U.S. Cl.
CPC ..................... *G06Q 30/02* (2013.01)

(58) Field of Classification Search
CPC ... G06F 3/1243; G06F 3/0482; G06F 12/123; G06F 12/1483; G06F 17/30775
USPC ............... 707/616, 641, 713, 999.101
See application file for complete search history.

(56) References Cited

U.S. PATENT DOCUMENTS

| | | | |
|---|---|---|---|
| 6,182,060 B1* | 1/2001 | Hedgcock et al. ............... 1/1 |
| 6,839,680 B1* | 1/2005 | Liu et al. ................. 705/7.33 |
| 7,003,476 B1* | 2/2006 | Samra et al. ............. 705/7.28 |
| 7,835,990 B2* | 11/2010 | Coleman .................... 705/51 |
| 7,853,563 B2* | 12/2010 | Alvarado et al. ........... 707/616 |
| 2002/0065718 A1* | 5/2002 | Otani et al. ............... 705/14 |
| 2004/0215509 A1* | 10/2004 | Perry ........................ 705/14 |
| 2007/0067297 A1* | 3/2007 | Kublickis ................... 707/9 |
| 2008/0033809 A1* | 2/2008 | Black et al. ............... 705/14 |
| 2008/0082417 A1* | 4/2008 | Publicover ................. 705/14 |
| 2008/0235078 A1* | 9/2008 | Hong et al. ................ 705/10 |
| 2008/0294607 A1 | 11/2008 | Partovi et al. |
| 2009/0070129 A1* | 3/2009 | Inbar et al. ................. 705/1 |
| 2009/0112701 A1* | 4/2009 | Turpin et al. .............. 705/10 |
| 2009/0150935 A1* | 6/2009 | Peters et al. .............. 725/46 |
| 2009/0163183 A1 | 6/2009 | O'Donoghue et al. |
| 2009/0216620 A1 | 8/2009 | Lee |

(Continued)

FOREIGN PATENT DOCUMENTS

KR    10-0824091    4/2008

OTHER PUBLICATIONS

Authorized officer Mi Jeong Park, International Search Report and Written Opinion in PCT/US2011/049786, mailed Apr. 27, 2012, 9 pages.

(Continued)

*Primary Examiner* — Mohammed R Uddin
(74) *Attorney, Agent, or Firm* — Fish & Richardson P.C.

(57) ABSTRACT

A computer-implemented method comprises receiving a request for content from a user, determining two user lists that are associated with the user, each user list including a definition that characterizes members of a respective user list, determining a consumer is a subscriber to the two user lists, determining the consumer has indicated a preference to target members that are included in both user lists, and providing an indication to the consumer for all users that are included in both user lists including providing the definitions associated with both user lists along with the request to the consumer.

21 Claims, 10 Drawing Sheets

(56) References Cited

U.S. PATENT DOCUMENTS

| | | | |
|---|---|---|---|
| 2010/0042507 A1* | 2/2010 | Pritchard et al. | 705/26 |
| 2010/0063969 A1* | 3/2010 | Kasargod et al. | 707/740 |
| 2010/0161377 A1* | 6/2010 | Hines et al. | 705/10 |
| 2010/0185517 A1* | 7/2010 | Higgins et al. | 705/14.58 |
| 2010/0280908 A1* | 11/2010 | Benz et al. | 705/14.71 |
| 2011/0191142 A1* | 8/2011 | Huang et al. | 705/7.33 |
| 2012/0004954 A1* | 1/2012 | Eisinger et al. | 705/14.1 |

OTHER PUBLICATIONS

Chang, F., et al. (2006). "Bigtable: A Distributed Storage System for Structured Data," OSDI '06: Seventh USENIX Symposium on Operating System Design and Implementation, pp. 205-218.

Authorized officer Nora Lindner, International Preliminary Report on Patentability in PCT/US2011/049786, mailed Mar. 14, 2013, 6 pages.

Office Action in Australian Application No. 2011296102, mailed Jun. 18, 2014, 3 pages.

* cited by examiner

JOINING MULTIPLE USER LISTS

CROSS-REFERENCE TO RELATED APPLICATION

This application claims priority to U.S. Provisional Application No. 61/379,281, filed on Sep. 1, 2010. The disclosure of the prior application is considered part of and is incorporated by reference in the disclosure of this application.

TECHNICAL FIELD

This document relates to presenting content.

BACKGROUND

Providing relevant advertising content to users is generally important to advertisers and service providers. However, implementing a cost-effective way of providing such relevant advertising content can prove difficult in an ever-changing online market. Further, while relevant information for targeting a particular user may be known by one entity, others may not readily have access to or be able to use such information when, for example, making targeting decisions.

SUMMARY

This document discusses systems and techniques by which multiple user lists are joined.

In one aspect, a computer-implemented method comprises receiving a request for content from a user, determining two user lists that are associated with the user, each user list including a definition that characterizes members of a respective user list, determining a consumer is a subscriber to the two user lists, determining the consumer has indicated a preference to target members that are included in both user lists, and providing an indication to the consumer for all users that are included in both user lists including providing the definitions associated with both user lists along with the request to the consumer.

In another aspect, a computer-implemented method comprises providing a user interface including a presentation of one or more user lists to a consumer, each user list including a definition that characterizes members of a respective user list, receiving an indication of a selection of two lists from the user lists, receiving an indication of a function for joining the user lists to create a customized list that includes one or more members, and storing the selection and the function for recall when a user associated with both lists provides a request for content.

Implementations can include any, all, or none of the following features. The presentation includes a list of user lists and meta data describing each definition. The indication of a function is a Boolean AND function. The indication of a function is a Boolean NOT function. The indication of a function is a Boolean OR function. Joining the user lists to create a customized list includes using numerical comparisons and functions using information associated with users who are members of the user lists. The method further comprises determining three or more user lists that are associated with the user, each user list including a definition that characterizes members of a respective user list, determining a consumer is a subscriber to the three or more user lists, determining the consumer has indicated a preference to target members that are included in the three or more user lists, and providing an indication to the consumer for all users that are included in the three or more user lists including providing the definitions associated with the three or more user lists along with the request to the consumer. The method further comprises receiving a request for content from a user, determining the user is a member of one or more of the two user lists, determining if the function is satisfied, and providing an indication of the satisfied function along with the request to the consumer.

In another aspect, a computer-implemented method comprises presenting user lists to a consumer, each user list including a definition describing members of a respective user list, receiving a selection of at least two user lists for subscription to by the consumer, creating a customized list including receiving a definition that is a function that relates the at least two user lists, and storing the customized list including the definition.

Implementations can include any, all, or none of the following features. The function is an AND function. The method further comprises receiving a request for content from a user, determining the user is a member of one or more of the at least two user lists, determining if the function is satisfied, and providing an indication of the satisfied function along with the request to the consumer. The function is a Boolean function.

In another aspect, a computer-implemented method comprises presenting user lists to a consumer, each user list including a definition describing members of a respective user list, receiving a selection of at least two user lists for subscription to by the consumer where at least two of the user lists are associated with a different ownership entity, creating a customized list including receiving a definition that is a function that relates the at least two user lists, and storing the customized list including the definition such that unrelated user list data can be merged resulting in a more complex user list that specifies a consumer-defined combination of characteristics of members of the customized list.

In another aspect, a computer-implemented method comprises determining one or more user lists available for subscription, each user list including a definition that describes members of a respective user list, receiving a selection by a consumer of a subscription to two or more of the user lists, merging user list data including merging at least two user lists including merging the user list data according to a function defined by the consumer, the function describing a desired combination of the definitions associated with respective merged user lists, and providing to the consumer an indication of a user request for content when a request for content is received and the function is satisfied.

Implementations can include any, all, or none of the following features. The request is a request for an ad to be displayed to the user and where the consumer is an advertiser that is to provide customized content to the user. The user list comprises the definition and one or more members each identified by user-specific data. The user list is stored in a table of user lists and where the user-specific data identifies the user. The user-specific data is a global identifier associated with the user in an advertising serving system. The user lists are used by the consumer for adjusting bids in real time. The user lists are used by the consumer for customizing content to be presented to the user.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
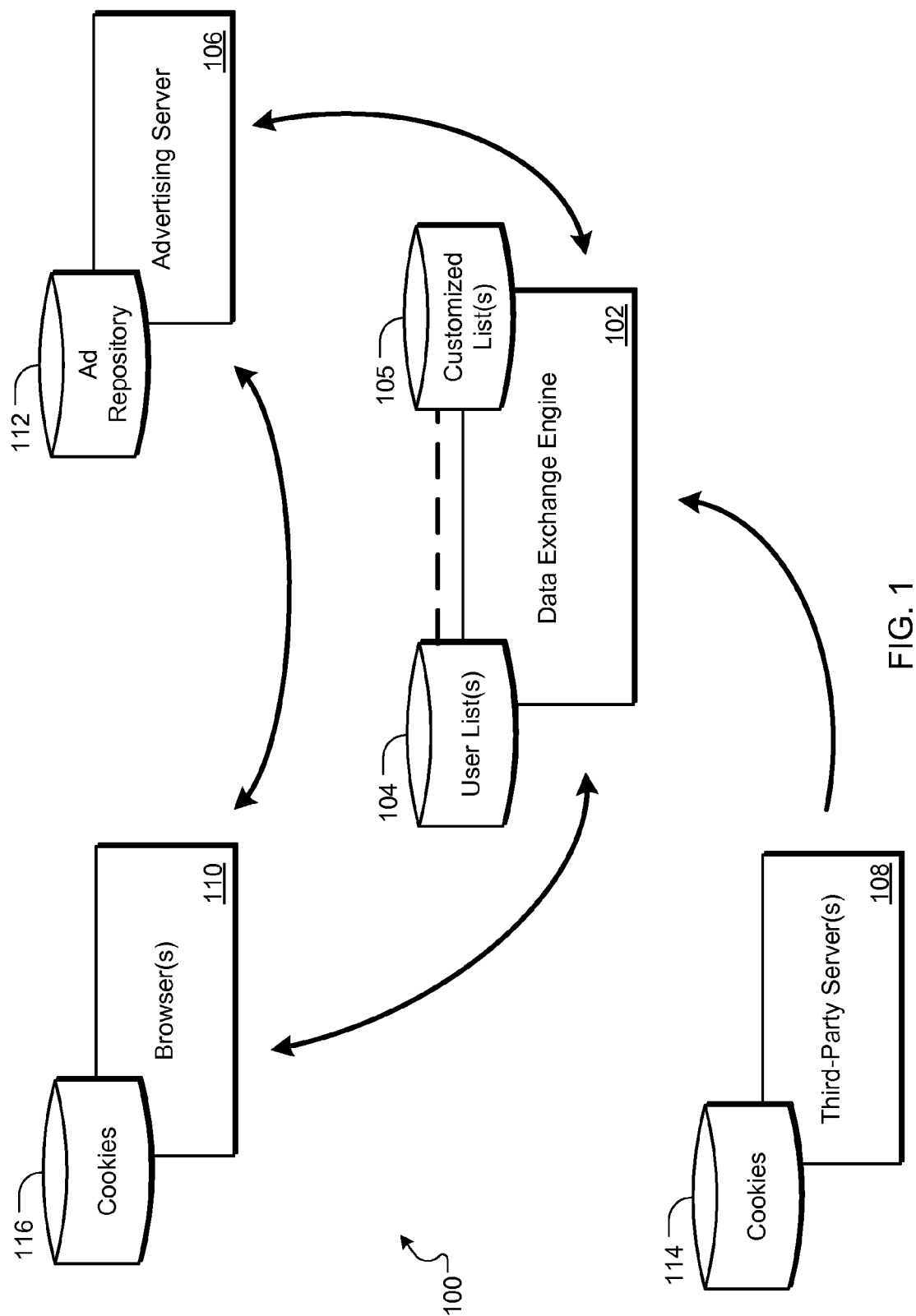
FIG. 1 is a schematic diagram of an example system for providing and using shared data.

Advertisers, publishers, and service providers generally may wish to exchange data for purposes of implementing a meaningful way of providing information and/or services (e.g., advertising content) to online users. If specific content is determined to be meaningful to a particular user, then the user may wish to access the content, purchase the content, or otherwise interact with the content. This interaction can provide revenue to the content provider (e.g., advertiser, publisher or service provider). If a particular content provider (e.g., advertiser, publisher, or service provider) can collect data about how specific content may or may not be meaningful to users (i.e., in the form of a user list), the collected data may be used by others in a variety of ways. One use relates to selecting targeted content. Other uses are possible, such as in adjusting bids in an auction based, for example, on user lists that indicate specific content is of interest to one or more users. User lists can be published, sold, licensed or otherwise accessed to assist in providing personalized content to the specific users and increasing revenue for a content provider. In some implementations, the definition of (and components included with) a user list can include: a numeric identifier, a short name, a free-text description (e.g., including a description of the process by which the user list was generated, what type of users are in the user list, etc.), the identifier and/or name of the user list's owner/holder, subscribers' names/identifiers, identifiers of the users who are members of the user list, and so on.

User lists can represent specific user information pertaining to predefined categories. The categories can be defined by the data owners. For example, a user list may include data about one or more users which characterizes the users to a category (e.g., homeowner, craftsman, DVD renter, etc.) to allow targeting of the users by, for example, publishers or advertisers. In some implementations, the user lists can be used to target relevant advertising content.

User lists can be generated and exchanged according to a number of rules, and those rules can be used to market particular user lists to specific consumers. The rules can employ methods of assigning users to particular user lists. Such rules can provide a logical categorization of data, information, or services for the purposes of determining which data content in the user lists is particularly relevant to a number of users.

Methods are described for associating user specific information with one or more user lists that are owned or maintained by a data owner. An association between the user-specific data and the user lists is made. The association can be exploited, for example, for real-time bidding in response to requests for content or to customize content to be provided to a specific user. Other uses of the user list information and associations are possible.

In some implementations, two or more user lists can be "joined", meaning that users who are members of the two or more user lists can be members of a user list that logically joins the two or more user lists. In some implementations, the mechanism or function by which the user lists are joined can use Boolean operators (e.g., AND, OR, NOT, etc.). As an example, User List XANDY can be the members of User List X AND members User List Y, while User List XORY can be the members of User List X OR members User List Y.

In some implementations, other functions can be used, such as comparison functions. For example, if users' incomes are known, User List I-200 can include members with incomes of $200K or greater. As a result, advertisers can target members of the User List I-200, for example, for ads of products that are likely to be affordable by high-income consumers. Likewise, if user's ages are known, User List A-50-70 can include members who have ages between 50 and 70, and such a user group can be used, for example, by advertisers who want to target people nearing or at retirement age. In another example, advertisers may target ads for high-end investments to the members of the joined user lists I-200 and A-50-70.

In some implementations, the union or intersection of two or more user lists can exist only briefly, for example, for just long enough (e.g., at run-time) for advertisers to target ads to the members of the joined user lists. In some implementations, the joined user lists can be saved, for example, and given a name and a description that includes the semantics and/or descriptions of the individual user lists and a joining function. In some implementations, consumers of user lists (e.g., advertisers who use them to target specific users who are potential customers) can subscribe to various user lists, e.g., by paying a fee to have access to the information in the user lists. Fees or other monetary arrangements can be, for example, on a per-user basis, a scheduled time, and so on. In some implementations, fees can be tied to the number of ad impressions that are served by the advertisers upon use of the user list information.

FIG. 1 is a schematic diagram of a system 100 for providing and using shared data. The shared data can, for example, include user-related data of the form of user lists detailing a number of predefined categories pertaining to specific users. The categories can be defined by or relate to user information including, but not limited to, browser history, user selections, cookie information, user-provided preferences, purchase histories, web search data, or other data (i.e., where the user has provided permission for the storing and/or collecting of such data). In some implementations, a user list is owned by a data provider that gathered the information in a respective user list. In some implementations, the user lists can be shared with other entities, such as for example using a data exchange. For example, the user lists can be shared amongst advertisers, third-party service providers, or third-party advertisers, data aggregators, and other online users.

The user lists can be provided to the data exchange and maintained by the data exchange and/or by the data owners. User lists can be updated as appropriate to either refine the category/categories associated therewith or the users that are members of a given list. Management of user lists is described in greater detail below.

The system 100 includes a data exchange engine 102 for providing an interface for advertisers and other consumers to discover and/or license user lists 104. The data exchange engine 102 can be configurable to maintain, update, present, license, sell or otherwise manage one or more user lists based on owned or permissioned data. The generated user lists can include user-specific associations characterizing specific online user behavior. The associations can be used, for example, to provide personalized content from an advertising server 106, a third-party server 108, or other content provider. The data exchange engine 102 as described here may parallel the functionality of an online advertisement exchange system for active targeted online advertisers, for example.

The system 100 includes a data store of customized lists 105 that are based on user lists 104. For example, an entry in the data store of customized lists 105 can include definitions with functions that represent various combinations (e.g., unions, intersections, etc.) of two or more user lists 104. In some implementations, consumers (e.g., advertisers) can use one or more user interfaces (e.g., provided by the data exchange engine 102) to select two or more user lists 104 to produce a customized list.

In some implementations, the data exchange engine 102 can create an exchange between owners of permissioned data and consumers of such data. Consumers of the permissioned data can include advertisers that seek to target particular categories of users. In some implementations, the data exchange engine 102 provides a mechanism for a provider of advertising placement services in targeted online advertising to make available additional third-party data sources to buyers of advertising space. In some implementations, the data exchange engine 102 can provide user lists to publishers, syndicates, and other data providers for various purposes, including the targeting of advertising content to users.

The data exchange engine 102 can provide an interface for data owners to securely view and manage their own data (i.e., manage a user list). For example, a data owner can generate and store information in a user list by entering data both manually and automatically. Other entities may be permitted to enter/maintain information in a user list. Publishers can also extract data for direct sales models or other marketing plans. Although computer hardware is not depicted in the data exchange engine 102, processors, memory, and other processing components may be included.

The advertising server 106 can provide advertising content to any number of browsers 110 via the data exchange engine 102 or directly. In addition, the advertising server 106 can be configurable for receiving advertising content requests and providing advertising content to requesting users. In operation, the advertising server 106 can select advertisements targeted based on one or more criteria and in view of data that is included in one or more user lists. The advertising server 106 can also provide access to other storage elements, such as ad repositories, in the example shown as ad repository 112. The ad repository 112 can be used to store advertising content associated with particular keywords, bidding criteria, advertisers, and targeting criteria. Data storage elements may include any one or combination of methods for storing data, including without limitation, arrays, hash tables, lists, and pairs. The advertising server 106 can access other similar types of data storage devices, such as user lists 104, for example. While reference is made to providing advertisements, the advertising server 106 can provide other forms of content.

In some implementations, advertisers can work with data providers to purchase or license user lists for purposes of targeting certain categories (e.g., demographic categories, interest categories, preference categories). The user lists can be analyzed for quality and other considerations. The advertisers can use the user lists for determining targeting criteria or to modify current bids, for example. In one example use case, an advertiser can subscribe for a period of time to a user list. The user list itself may be defined as being associated with a certain category (e.g., Internet shoppers interested in buying a sports car) of users. Requests for advertisements can be received by the advertising system, and the data exchange can be used to determine for a given user to which user lists the user is subscribed. In a real-time bid example, the advertisers that have subscribed to the user lists may be presented with the request (and necessarily information that the users satisfy the category(ies) associated with the user list(s)), and then may adjust/submit bids in consideration of such information. This is just one example of a use for the user list data.

The third-party servers 108 can provide third-party services to any number of browsers 110 via the data exchange engine 102. For example, the third-party servers 108 can provide web services, advertising services, or external APIs (application programming interfaces) to connect to a third-party server. The third-party servers 108 can include, for example, one or more servers executing a search engine application program. In some implementations, the third-party servers 108 can include a related information server or an advertising server. Third-party servers 108 can track user activity using, for example, cookies 114.

The browser 110 represents a user browsing the Internet. The browser 110 can access any website available on a network belonging to a person, or any other type of entity such as a company, enterprise, etc. For example, in FIG. 1 browser 110 can access a service or website. The service or website can be hosted by the third-party server 108, or alternatively by another server associated with system 100. A user can employ the browser 110 to search the Internet for services, information, or merchandise. The browser 110 can track user activity using, for example, cookies 116.

In some implementations, the advertising server 106 includes one or more advertisement customizers (not shown) operable to customize advertising content according to one or more user lists. In particular, an advertisement customizer can customize the display criteria, language, or other content of an advertisement according to user list information. For example, if a particular user list includes user-entered searching pertaining to purchasing a vehicle, the advertising server 106 can use the user-entered searching information (e.g., a cookie stored from performing a web search in a browser) to customize the display or content of an advertisement. The customization can, for example, provide the user with a more relevant advertisement.

In operation and for each generated user list, the system 100 can store, for example in a table-based repository, a list of user lists for which a particular user belongs. The table-based repository can, for example, be represented by a proprietary distributed storage system having a multi-dimensional sorted map as described in the paper entitled "Bigtable: A Distributed Storage System for Structured Data" by Fay Chang, Jeffrey Dean, Sanjay Ghemawat, Wilson C. Hsieh, Deborah A. Wallach, Mike Burrows, Tushar Chandra, Andrew Fikes, and Robert E. Gruber, the content of which is incorporated herein by reference in its entirety. The table-based repository represents a distributed storage system for managing structured data that is designed to scale to a very large size (e.g., petabytes of data across thousands of commodity servers).

Each user list in the proprietary database can be included in one or more tables having multiple dimensions (one of which may be a field for time, allowing for versioning and garbage collection).

The system 100 can provide an index to the table-based repository. The index can be represented by, for example, a user cookie. For example, the table-based repository may be a set of rows and columns where the rows represent cookies corresponding to particular users and the columns represent a characterization associated with the user list, such as particular categories, keywords, websites, or other descriptive data.

At some point, the user browser 110 can make a request for advertising content from the advertising server 106 or the third-party server 108. The data exchange engine 102 can retrieve a list of user lists from the table-based repository associated with a received request from a given user and provide the request to identified consumers of the user lists. Any subsequent processing of the request can use the list, for example, for targeting, advertising customization and bid generation. The list of user lists or portions of the list can also be transmitted to a real-time bidder to provide the bidder with pertinent information about one or more users. Other uses are possible.

Figure 2:
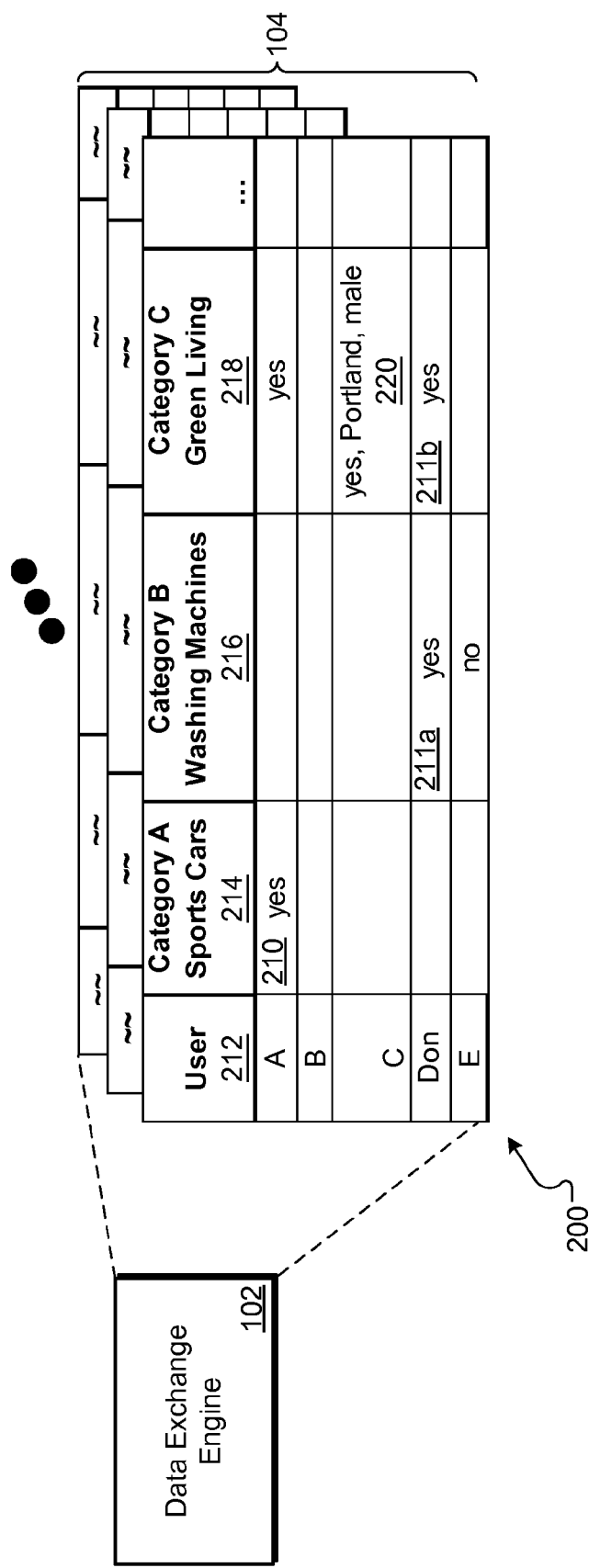
FIG. 2 is a schematic diagram of example user lists.

FIG. 2 is an example showing a schematic diagram of user lists 104 stored in a table 200. In this example, one or more entities (e.g., a web publishing entity that collected the user data) provided the user lists 104 to the data exchange engine 102. In some implementations, the user lists 104 in the table 200 are all provided by a same entity. In some implementations, the user lists 104 in the table 200 can include user lists owned/associated with different entities. In some implementations, users create their own user lists and provide the lists to the data exchange engine 102. For example, users can format content in user lists according to personal preferences and offer the user list data to the data exchange engine 102 for publication, management and use in targeting content to users. The data in the user lists 104 is developed, for example based at least in part on user-provided, searching and browser data. In this example, the data exchange engine 102 can manage the user lists 104 which details users 212 A-E. In some implementations, the table 200 can be indexed by a user identifier, such as the users 212 column.

In the example shown, each row represents a single user. A user identifier (not shown) can be used to identify a user. The user identifier can be a user identifier associated with a user in a domain associated with the entity that owns/provides the data (i.e., a local identifier). In some implementations, such as those where plural different entities provide user lists that are stored in a single table, the user identifier can be of the form of a global identifier associated with the user, such as an identifier that the advertising system assigns to the user. Global identifiers can be associated with "local" entity identifiers and mapped such that requests that include a local entity identifier can be associated with the global identifier and hence, can be associated with user lists associated with plural entities. As a user can be associated with multiple user lists owned by different data owners, global identifiers can help to tie together those user lists for that user.

In the example shown, each column represents a user list that includes a characterization (sometimes referred to as a definition), such as by way of a particular category(ies), keyword(s), website(s), demographic(s), interest(s), or other user classification. Example characterizations in the table 200 include sports cars, washing machines, and green living (e.g., including environmentalists, recyclers, low carbon footprint individuals, etc.). The characterization can include descriptors, such as keywords, that describe a given category. Each characterization may embody the combination of plural separate categories or subject matter. For example, the characterization sports cars, may embody those individuals that visited a web site that were interested in cars and those that were particularly interested in sports cars (which themselves represent two different categories). In some implementations, logical combinations of categories or subject matter can be used to define the characterization for a given user list.

Columns 214-218 of the table 200 each can identify, at least at a high level, a different characterization associated with a different user list. For example, the column 214 identifies users characterized by "Category A Sports Cars." Other example characterizations and associated user lists are represented by column 216 (i.e., "Category B Washing Machines") and column 218 (i.e., "Category C Green Living") to name a few examples. The table 200 can represent hundreds or thousands of characterizations and associated user lists.

In some implementations, each entry in the table 200 (i.e., the intersection of a row and a column) represents whether the user is a member of a given user list. For example, entry 210 indicates that user A is interested in or associated with a user list that has the characterization of sports cars, entry 211a indicates that user Don is interested in or associated with a user list that has the characterization of washing machines, and entry 211b indicates that Don is interested in or associated with a user list that has the characterization of people with "green" lifestyles. In some implementations, other data may be included in the entry. Other data can include geo-location data, cookie data, further personal data related to the user and known by the data owner, example web pages or example content (e.g., content surfed by the user), keyword searches, location data, website data, side vertical data, page vertical data, formatted text strings (where the data owner may include data related to the particular user in accordance with a definition set by the data owner (e.g., a series of bits that are set or not depending on the individual user's data for things like demographics, other interests, or other data that is different from the characterization but may be of use in targeting information to the particular user)) or other data. For example, entry 220 includes an indication that user C is not only a member of the user list associated with category C (green living) but also that the user is located at a particular location (e.g., lives in Portland) and is a member of certain demographic groups (e.g., is male).

Identification of user lists to which a person belongs can be made by the data exchange engine 102 when a cookie or other user identifiable information is received. In some implementations, the data exchange engine 102 uses the cookie or user identifying information as an index to the user lists 104. For example, the data exchange engine 102 can cross reference received user identifier data with particular user list information to determine an association between user list data and the cookie data/user information. As shown in user lists 104, a user (A) showed an interest in user list A which is characterized by the keywords "sports cars". For example, the user may, as part of a session with a given data provider, have provided a request to view sports cars made by Lexus such as providing a keyword search for "Lexus sports cars."

Figure 3:
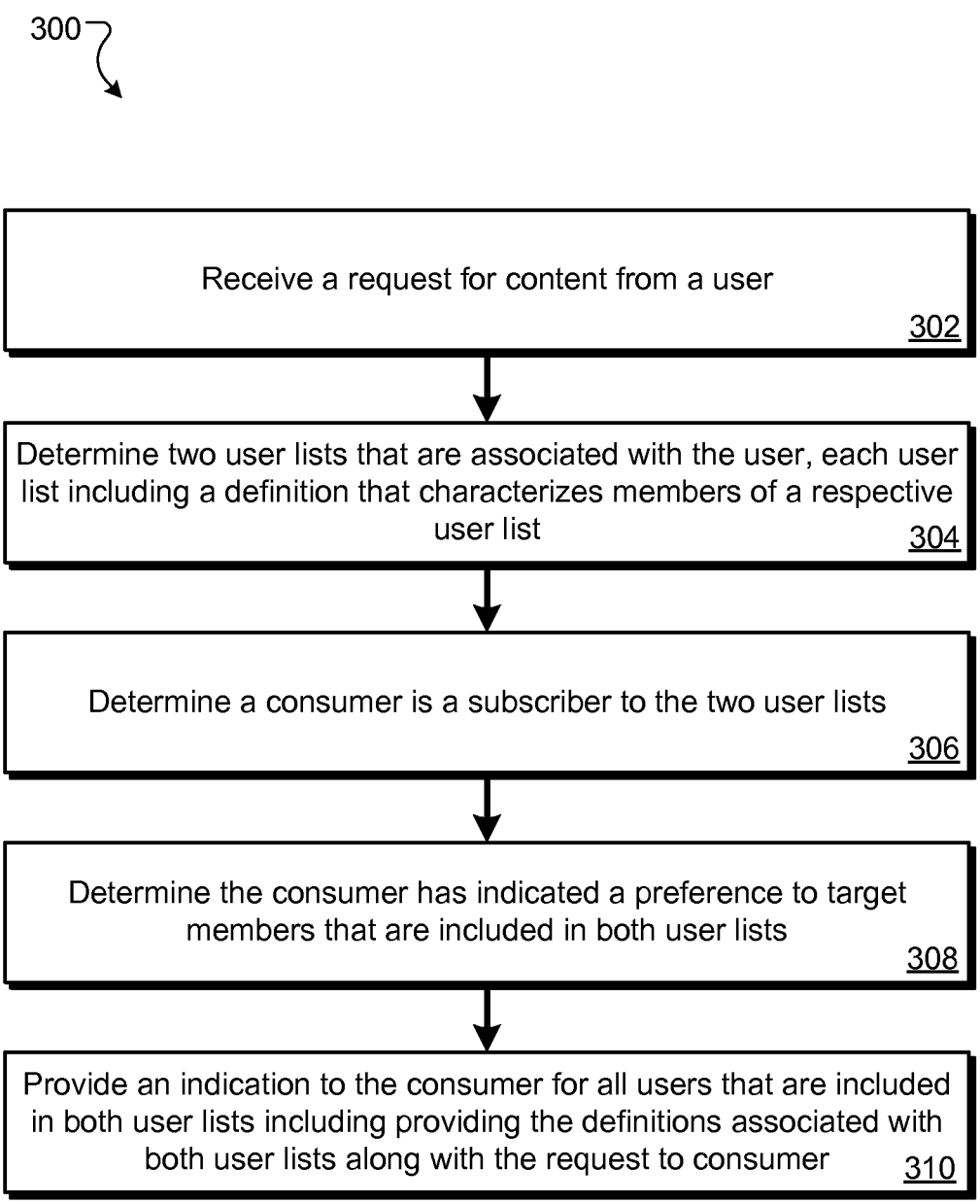
FIG. 3 is a flow diagram of an example process for joining two user lists in response to receiving a request for content from a user.

FIG. 3 is a flow diagram of an example process 300 for joining two user lists in response to receiving a request for content from a user. The process 300 may be executed, for example, by the data exchange engine 102 shown in FIG. 1 in order to join two user lists to provide, for example, customized content in an ad. More or fewer participants may be involved.

At stage 302, a request for content is received from a user. In some implementations, the request for content can be a request to serve an ad, for example, that the data exchange engine 102 receives as a result of a user (e.g., Don) who is browsing the Internet. Prior to receipt of the request to serve the ad, Don's browser may initially display search results that have been received in Don's browser in response to his search query, such as a query for area appliance stores (e.g., keywords "major appliances"). Don may formulate the query to search for a replacement washing machine, for example, and may even include "washing machines" in the query. The search results may contain several entries for area appliance stores, and Don may select (e.g., click on) one of the search results entries. For example, one entry can be for Gary's Appliances Store, and the entry can include the name of the store, an address and phone number, a map and driving instructions, a snippet that describes the store, a clickable link to a corresponding webpage, and so on. As a result of clicking on the search result, Don's browser can attempt to navigate to the webpage (e.g., www.garysappliances.com) that corresponds to the search result. In this example, the webpage www.garysappliances.com can be designed to include or embed one or more ads, each of which being an available impression that can be served, for example, by the ad server 106. Thus, in this example, the request for content received from the user Don is a request to serve an ad on www.garysappliances.com. This request can, for example, be received and processed by the data exchange engine 102 and/or other engines (e.g., by an advertising server engine).

At stage 304, two user lists that are associated with the user are determined, each user list including a definition that characterizes members of a respective user list. In the current example, referring to FIG. 2, the data exchange engine 102 can look up user lists 104 in the table 200 that are associated with Don. The look-up can employ user-specific data, such as the user's user identifier (e.g., "Don" or some other identifier as described above), as an index to the row of interest in the table 200. Further, information from, for example, a cookie on the user's computer (or information from the user's search query) can be used to associate the Category B Washing Machines user list with the user Don, an association depicted in FIG. 2 by the entry 211a in column 216, signifying that Don is a member of that user list. The data exchange engine 102 can make the association using the definition for Category B Washing Machines that characterizes members in the user list. Furthermore, the data exchange engine 102 can determine that Don is also a member of a second user list, that being Category C Green Living, an association depicted in FIG. 2 by the entry 211b in column 218, signifying that Don is a member of that user list.

At stage 306, a consumer is determined to be a subscriber to the two user lists. For example, the consumer can be an advertiser, and the data exchange engine 102 can determine that the advertiser subscribes to both the Category B Washing Machines user list and the Category C Green Living user list. The advertiser may subscribe to both user lists, for example, because the company manufactures appliances (including washing machines) that are energy efficient, and by subscribing to both user lists, the company can target ads to members of one or both user lists. The advertiser may subscribe to several other user lists that are not included in this example, and several other consumers (e.g., other advertisers) may also subscribe to both the Category B Washing Machines user list and/or the Category C Green Living user list.

At stage 308, a determination is made whether the consumer has indicated a preference to target members that are included in both user lists. In the current example, the data exchange engine 102 can determine if the consumer (e.g., the appliance advertiser) has indicated a desire to target ads to users interested in washing machines and green living, such as is the case for the user Don, and may be the case for several other users.

At stage 310, an indication is provided to the consumer for all users that are included in both user lists, including providing the definitions associated with both user lists along with the request to the consumer. Continuing with the current example, the data exchange engine 102 can provide the Washing Machines and Green Living user list definitions, a list of users (including Don and potentially others) in both user lists, and the ad request to a consumer (e.g., the particular ad server 106 that can serve the ad to www.garysappliances.com). The combination of information in this way essentially serves to "join" the two user lists. The ad server 106 that is selected by the data exchange engine 102 to receive the ad request and the joined information can be a consumer (e.g., one of several ad servers 106) that has subscribed to the Washing Machines and Green Living user lists. This example that includes users of both lists is based on the use of the Boolean AND function. In other examples, e.g., if the function is the Boolean OR function, the data exchange engine 102 can provide to the advertiser a list of users who are in either list.

In some implementations, three or more user lists that are associated with the user can be determined. Furthermore, the data exchange engine 102 can determine if a consumer (e.g., an advertiser) is a subscriber to the three or more user lists. In some implementations, the data exchange engine 102 can determine if the consumer has indicated a preference to target members that are included in the three or more user lists. As a result, in some implementations, when a request for content is received, the data exchange engine 102 can provide an indication to the consumer for all users that are included in the three or more user lists. The indication can include providing the definitions associated with the three or more user lists along with the request to the consumer.

In some implementations, the information acquired in the previous steps, including the user lists, can be passed to a real-time bidder. The bidding in this case can involve bids received from one or more consumers, or advertisers, who can bid on available impressions corresponding to, for example, the website to which the user is navigating. Using the targeting information, for example, bids can be adjusted in real-time. For example, a bid for an available impression may be significantly higher than otherwise because the targeted ad may be more likely to lead to a conversion. In some cases, bidding may occur without the use of the additional targeting information, and the additional targeting information can be used later as needed (e.g., to change the content of an ad). Real-time bidding can be used in other processes, including some or all of the processes 400-900 described below with reference to FIGS. 4-9.

In some implementations, optionally and irrespective of whether bidding has occurred using the targeting information, user list and other information can be provided to an ad customizer. Returning again to the example involving ads provided to the user Don, the ad customizer can customize the ad using available information, including information from the two or more user lists to which Don is a member. The customized ad can be served right away and/or stored in the ad repository 112. Customization of ads can also be used in other processes, including some or all of the processes 400-900 described below with reference to FIGS. 4-9.

Figure 4:
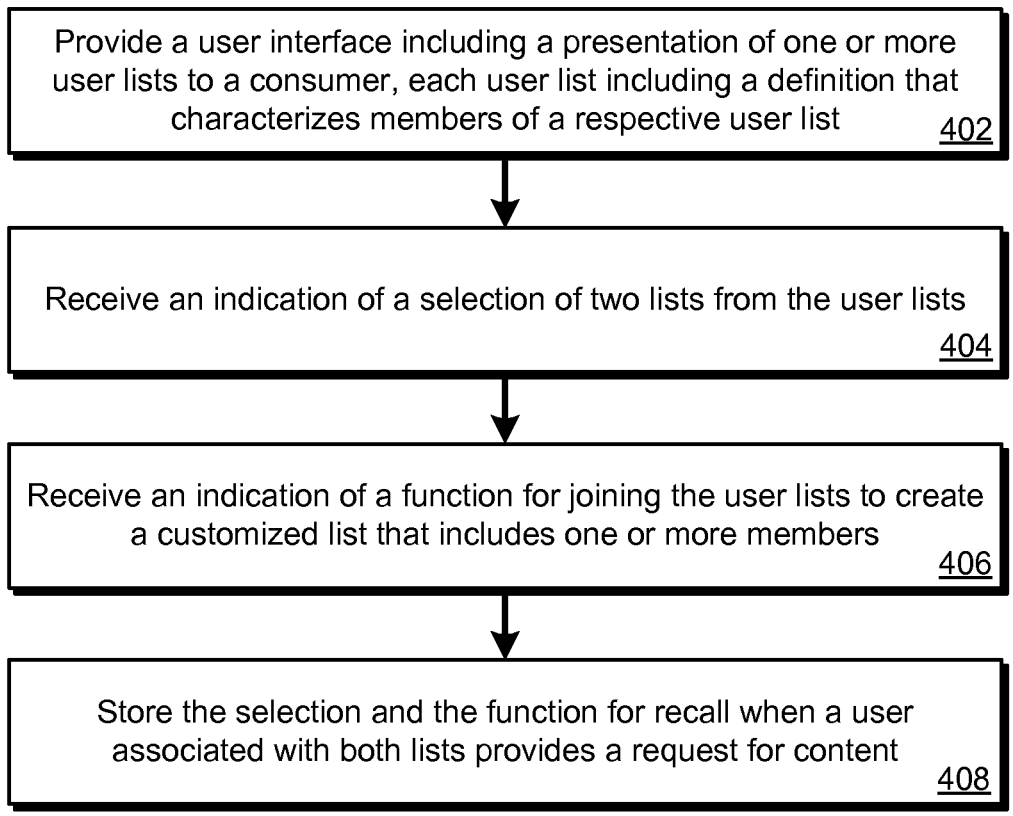
FIG. 4 is a flow diagram of an example process for defining and storing a function used for joining two user lists.

FIG. 4 is a flow diagram of an example process 400 for defining and storing a function (e.g., a Boolean function) used for joining two user lists. For example, the process 400 may be executed, at least in part, by the data exchange engine 102 shown in FIG. 1. Specifically, a consumer, such as an advertiser, can access a web site that is provided by the data exchange engine 102. Users of the website (e.g., advertisers who want to define and store joined sets of user lists) can access user interfaces that are provided by the data exchange engine 102. More or fewer participants may be involved.

At stage 402, a user interface, including a presentation of one or more user lists, is provided to a consumer. Each user list includes a definition that characterizes members of each respective user list. As an example, a consumer such as an advertiser can access an application that displays existing user lists and their definitions. In some implementations, the user interface can provide meta data associated with each user list, such as the number of users who are members, the percent of growth over time, statistics representing the geographic distribution (e.g., the numbers of members in Washington, Oregon, etc.), demographics (e.g., gender/age breakdowns, average incomes, education levels, etc.), ratings information, qualification information (e.g., requirements for the user to qualify for inclusion in the list) and so on. In some implementations, the user interface can identify how the consumer has previously used the user lists in previous joins, and include the number of resulting ad impressions for each, to a name a few examples. Example user lists that the consumer may see include user lists for members who are interested in Washing Machines, Green Living, and so on, representing several other user lists.

At stage 404, an indication of a selection of two lists from the user lists is received. For example, using controls within the user interface (e.g., checkboxes, mouse clicks, etc.), the consumer can select two user lists to be joined, e.g., the Washing Machines and Green Living user lists, for the purposes of creating a customized list.

At stage 406, an indication of a function for joining the user lists is received to create a customized list that includes one or more members. Continuing with the current example, the user may select the Boolean AND function for joining the Washing Machines and Green Living user lists in order to produce an intersection representing users who are interested in both categories. The intersection would include users such as Don who is interested in washing machines and living a green lifestyle, as depicted by entries 211*a* and 211*b* in FIG. 2. By joining the two lists with the AND function, the consumer is building an intersection of columns 216 and 218 in the table 200. If however, the consumer selects the Boolean OR function, the joining of the user lists produces the union of the two columns, or in the context of the current example, users who are interested in either washing machines OR green living (or both). In some implementations, any Boolean operators can be used in joining user lists, including combinations of ANDs, ORs and NOTs, such as in joins of three or more user lists. In some implementations, the user interface can include easy-to-use symbols that the user can select (e.g., with the mouse) or drag and drop into place to build the logic that represents the customized list. In some implementations, the user interface can display statistics corresponding to the resulting customized list, such as how many users are included in the customized list. In some implementations, the user interface can provide fields or other controls for the consumer to name the customized list and/or type in a description. The name, for example, can be used by the consumer in order to access the customized list at a later time, e.g., to make changes, etc.

At stage 408, the selection and the function are stored for recall when a user associated with both lists provides a request for content. For example, the consumer's customized list, including the user lists involved in the join and Boolean function(s) used in the join, is stored. In some implementations, the data exchange engine 102 can store the newly-created customized list in the data store of customized lists 105.

Figure 5:
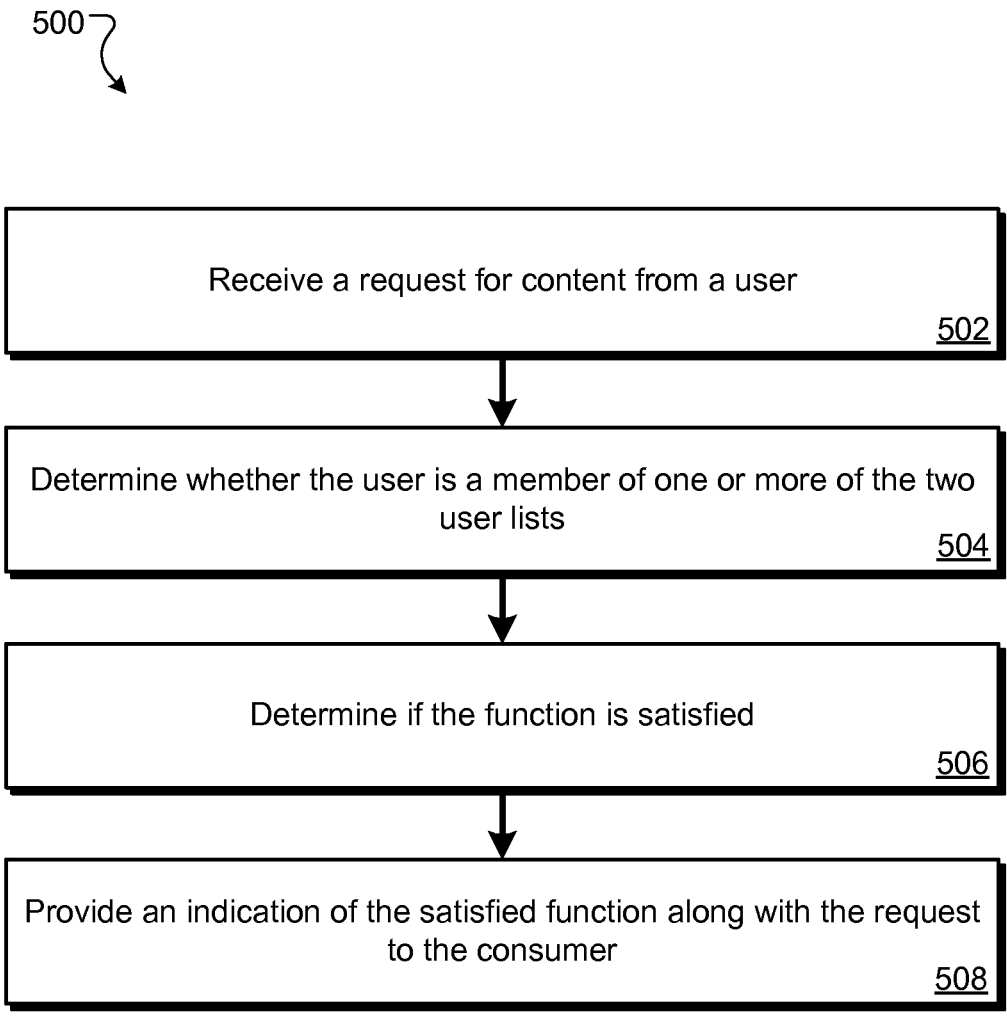
FIG. 5 is a flow diagram of an example method for processing a request for content from a consumer.

FIG. 5 is a flow diagram of an example process 500 for indicating that a user satisfies the function defined in the process 400 when processing a request for content from a consumer. More specifically, when a request for content (e.g., an ad request) is received, the process 500 can identify whether the user is a "member" of a customized list by way of satisfying the function(s) identified for the customized list formed by joining two or more user lists. The data exchange engine 102, for example, can perform the process 500. More or fewer participants may be involved.

At stage 502, a request for content is received from a user. In some implementations, the request for content can be a request to serve an ad, for example, that the data exchange engine 102 receives as a result of a user who is browsing the Internet and navigating to another webpage that includes a slot for an advertisement. For example, the user can be Gary, who like Don, also belongs to both the Washing Machines and Green Living user lists. The sequence of user actions leading up to the ad request in this example can be similar to those described above for stage 302 of the process 300.

At stage 504, a determination is made whether the user is a member of one or more of the two user lists. For example, when the request for content (e.g., an ad to be served on user Gary's browser) is received, the data exchange engine 102 can determine if Gary is a member of both the Washing Machines and Green Living user lists. The user lists are just two of the user lists in which the consumer may be interested in Gary's membership. In some implementations, the data exchange engine 102 can determine all of the user lists to which a user (e.g., Gary) belongs.

At stage 506, a determination is made whether the associated function is satisfied. For example, in the present example involving the customized list that is the intersection of the Washing Machines and Green Living user lists, the data exchange engine 102 can access the definition of the customized list that is stored in the data store of customized lists 105 and retrieve the function definition, as well as identifiers for the two user lists. In this case, because Gary (like Don) is a member of both user lists, and the function is a Boolean AND function, the data exchange engine 102 can determine that the function is satisfied.

In general, at stage 506, the data exchange engine 102 can access all of the customized lists that have been created by a subscriber and that correspond to a user's (e.g., Gary's) user lists. In each case, the data exchange engine 102 can determine if the function associated with each customized list is satisfied. As such, stage 506 determines a user's membership in one or more customized lists.

At stage 508, an indication of the satisfied function is provided along with the request to the consumer. For example, the data exchange engine 102 can provide, to the consumer (e.g., an advertiser), an indication that the AND function that joins Gary's membership in both lists is satisfied (e.g., logically TRUE). The indication can be provided at the same time that the data exchange engine 102 provides the request for content (e.g., the ad request) to the consumer (e.g., an advertiser).

Figure 6:
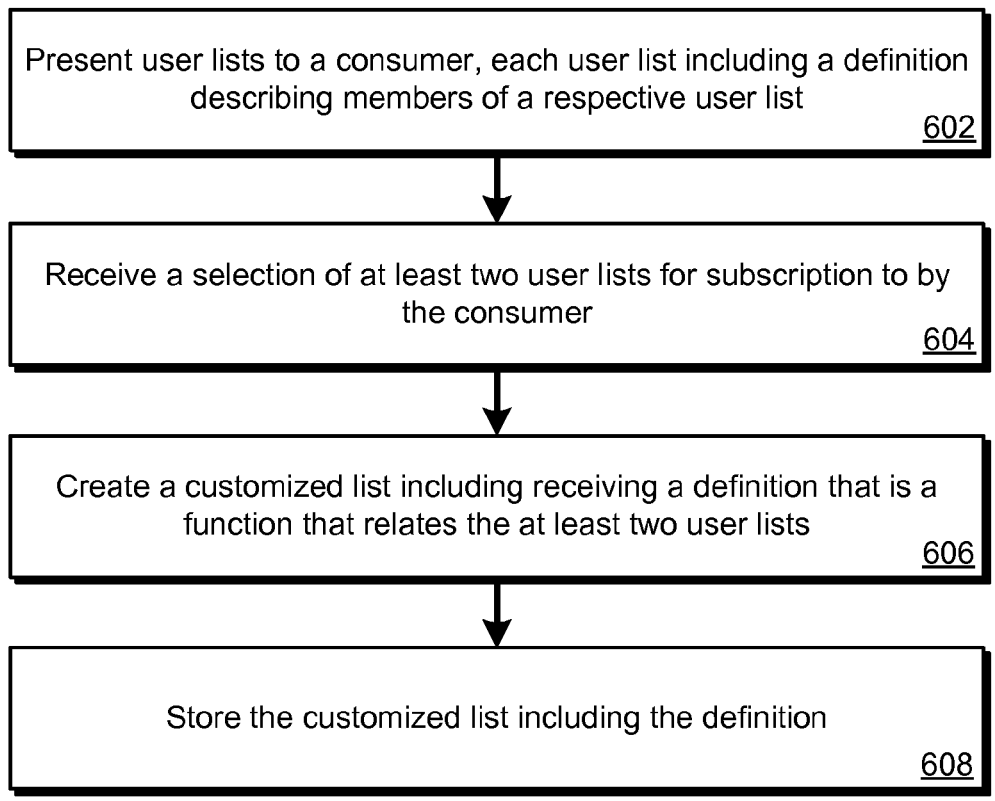
FIG. 6 is a flow diagram of an example process for defining and storing a customized list.

FIG. 6 is a flow diagram of an example process 600 for defining and storing a customized list (e.g., based on a function that relates at least two user lists). For example, the process 600 may be executed, at least in part, by the data exchange engine 102 shown in FIG. 1. Specifically, a consumer, such as an advertiser, can access a web site that is provided by the data exchange engine 102. Users of the website (e.g., advertisers who want to define and store customized lists) can access user interfaces that are provided by the data exchange engine 102. More or fewer participants may be involved.

At stage 602, user lists are presented to a consumer. Each user list includes a definition describing members of a respective user list. As an example, a consumer such as an advertiser can access an application that displays existing user lists and their definitions. In some implementations, the user interface can provide meta data associated with each user list, such as the number of users who are members, the percent of growth over time, statistics representing the geographic distribution (e.g., the numbers of members in Washington, Oregon, etc.), demographics (e.g., gender/age breakdowns, average incomes, education levels, etc.), and so on. In some implementations, the user interface can identify how the consumer has previously used the user lists in previous joins, and include the number of resulting ad impressions for each, to a name a few examples.

At stage 604, a selection of at least two user lists is received for subscription to by the consumer. For example, using controls within the user interface (e.g., checkboxes, etc.), the consumer can select two user lists to be joined, e.g., the Washing Machines and Green Living user lists, for the purposes of creating a customized list. The data exchange engine 102, for example, can receive the user lists for subscription. In this case, the consumer is designating a subscription to the joined set of user lists.

At stage 606, a customized list is created. The user list includes a definition that includes a function that relates the at least two user lists. For example, as part of the subscription process and creating a customized list (e.g., based on joining two other user lists), the consumer can define a function that relates the two user lists. For example, using Boolean functions (e.g., AND, OR, NOT), the consumer can create customized lists of various kinds, e.g., Washing Machines AND Green Living, Washing Machines OR Green Living, or Washing Machines AND NOT Green Living, to name a few examples. The latter customized list (i.e., Washing Machines AND NOT Green Living) can be used, for example, to target ads to users who need washing machines but do not care about their energy efficiency. For the purpose of the present example, the Boolean function that the user selects can be the AND function, meaning that the customized list that is created is Washing Machines AND Green Living.

At stage 608, the customized list and definition are stored. For example, the data exchange engine 102 can store the customized list in the data store of customized lists 105. From this point forward, for example, the Washing Machines AND Green Living customized list is available for use, such as for subsequent use by the data exchange engine 102 when content requests related to the customized list are received.

Figure 7:
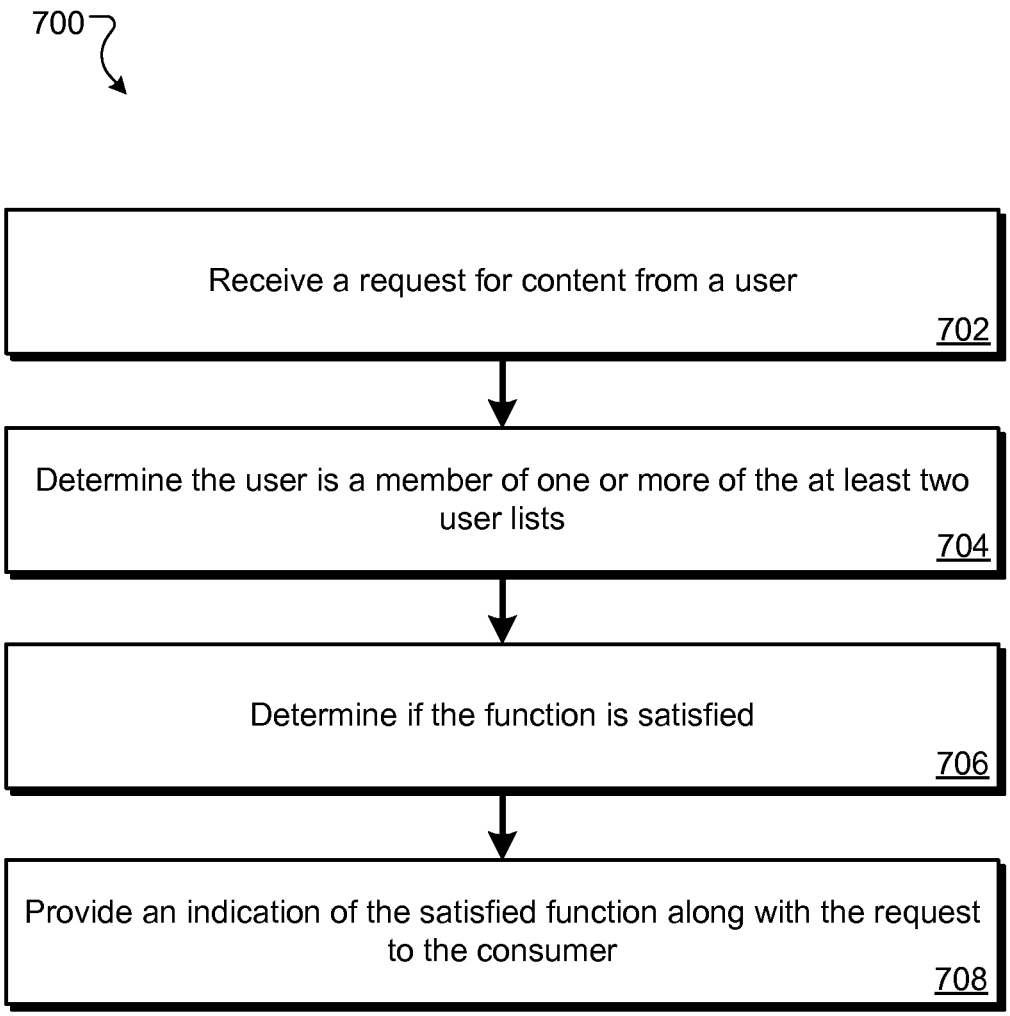
FIG. 7 is a flow diagram of an example method for processing a request for content from a consumer.

FIG. 7 is a flow diagram of an example process 700 for indicating that a user is a member of the customized list when processing a request for content from a consumer. More specifically, when a request for content (e.g., an ad request) is received, the process 700 can identify whether the user is a "member" of a customized list (e.g., created by the process 600) by way of satisfying the function(s) identified for the consumer-customized list formed by joining two or more user lists. The data exchange engine 102, for example, can perform the process 700. More or fewer participants may be involved.

At stage 702, a request for content is received from a user. In some implementations, the request for content can be a request to serve an ad, for example, that the data exchange engine 102 receives as a result of a user who is browsing the Internet and navigating to another webpage that includes a slot for advertisement. The sequence of user actions leading up to the ad request in this example can be similar to those described above for stage 302 of the process 300.

At stage 704, a determination is made whether the user is a member of one or more of the at least two user lists. For example, when the request for content (e.g., an ad to be served on user Gary's browser) is received, the data exchange engine 102 can determine if Gary is a member of a customized lists (e.g., Washing Machines AND Green Living).

At stage 706, a determination is made whether the associated function is satisfied. For example, in the present example involving the customized list that is the intersection of the Washing Machines and Green Living user lists, the data exchange engine 102 can access the definition of the customized list that is stored in the data store of customized lists 105 and retrieve the associated function, as well as identifiers for the two user lists. In this case, because Gary (like Don) is a member of both user lists, and since the function is a Boolean AND function, the data exchange engine 102 can determine that the function is satisfied.

At stage 708, an indication of the satisfied function is provided along with the request to the consumer. For example, the data exchange engine 102 can provide, to the consumer (e.g., an advertiser), an indication that the AND function that joins Gary's membership in both lists is satisfied (e.g., logically TRUE). The indication can be provided at the same time that the data exchange engine 102 provides the request for content (e.g., the ad request) to the consumer (e.g., the advertiser).

Figure 8:
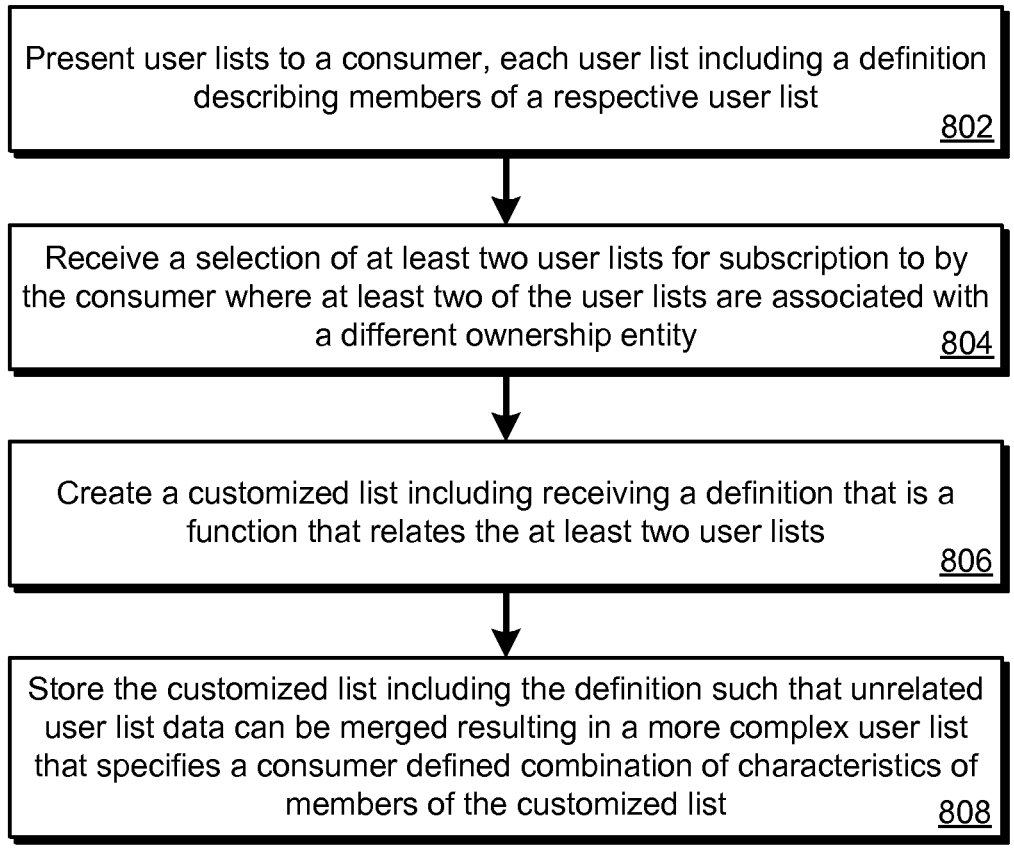
FIG. 8 is a flow diagram of an example process for defining and storing a customized list by joining user lists that are associated with two or more different ownership entities.

FIG. 8 is a flow diagram of an example process 800 for defining and storing a customized list by joining user lists that are associated with two or more different ownership entities. For example, one ownership entity may own user lists associated with hard goods, including appliances (e.g., washing machines, refrigerators, etc.), while a different ownership entity may own user lists associated with life styles (e.g., green living, volunteering, etc.). The data exchange engine 102, for example, can include a user interface that can perform the process 800, allowing user lists that are owned by different ownership entities to be joined. More or fewer participants may be involved.

In some implementations, the data exchange engine 102 can have financial arrangements by which each different ownership entity is paid for use of their user lists. For example, these costs can be passed on to consumers of the user lists, such as advertisers who use the data exchange engine 102 to join user lists. As a result, the data exchange engine 102 can serve as a clearinghouse for user lists and combinations thereof, no matter where their ownership lies.

At stage 802, user lists are presented to a consumer. Each user list includes a definition describing members of a respective user list. As an example, a consumer such as an advertiser can access an application that displays existing user lists and their definitions. In some implementations, the user interface can provide meta data associated with each user list, such as the number of users who are members, the percent of growth over time, statistics representing the geographic distribution (e.g., the numbers of members in Washington, California, etc.), demographics (e.g., broken down by gender, age, income, education level, etc.), and so on. In some implementations, the user interface can identify how the consumer has previously used the user lists in previous joins, and include the number of resulting ad impressions for each, to a name a few examples. In some implementations, the cost(s) associated with the use of each user list can also be displayed. For example, the costs can be based on the number of users in the user list, the value of the respective information, the number of eventual ad impressions that are served using the user lists, and so on.

In some implementations, some or all of the user lists that are associated with different ownership entities may not be stored by the data exchange engine 102 in the user lists 104. For example, ownership entities may store their "owned" user lists and provide permission to the data exchange engine 102 to access the user lists, e.g., over the Internet. In some implementations, the user lists stored in the user list 104 data store can be distributed at various locations, accessible by the data exchange engine 102.

At stage 804, a selection of at least two user lists for subscription to by the consumer is received, where at least two of the user lists are associated with a different ownership entity. For example, from the list of user lists, the consumer (e.g., advertiser) can select multiple user lists that have ownership spread over at least two ownership entities. In some implementations, the user's selection can be received by the data exchange engine 102.

At stage 806, a customized list is created and includes a definition that has a function that relates the at least two user lists. For example, the data exchange engine 102 can create the customized list using the information provided by the consumer, including the selection of the two or more user lists that comprise at least two ownership entities and a function that relates them. In some implementations, the function can include a Boolean function that uses Boolean operators such as AND, OR and NOT.

At stage 808, the customized list and the definition are stored such that unrelated user list data can be merged, resulting in a more complex user list that specifies a consumer-defined combination of characteristics of members of the customized list. For example, the data exchange engine 102 can store the customized list in the data store of customized lists 105. The resulting customized list 105 that is stored can be accessed as needed by the data exchange engine 102 and can provide an efficient way to merge user list information from entities that have different owners.

Figure 9:
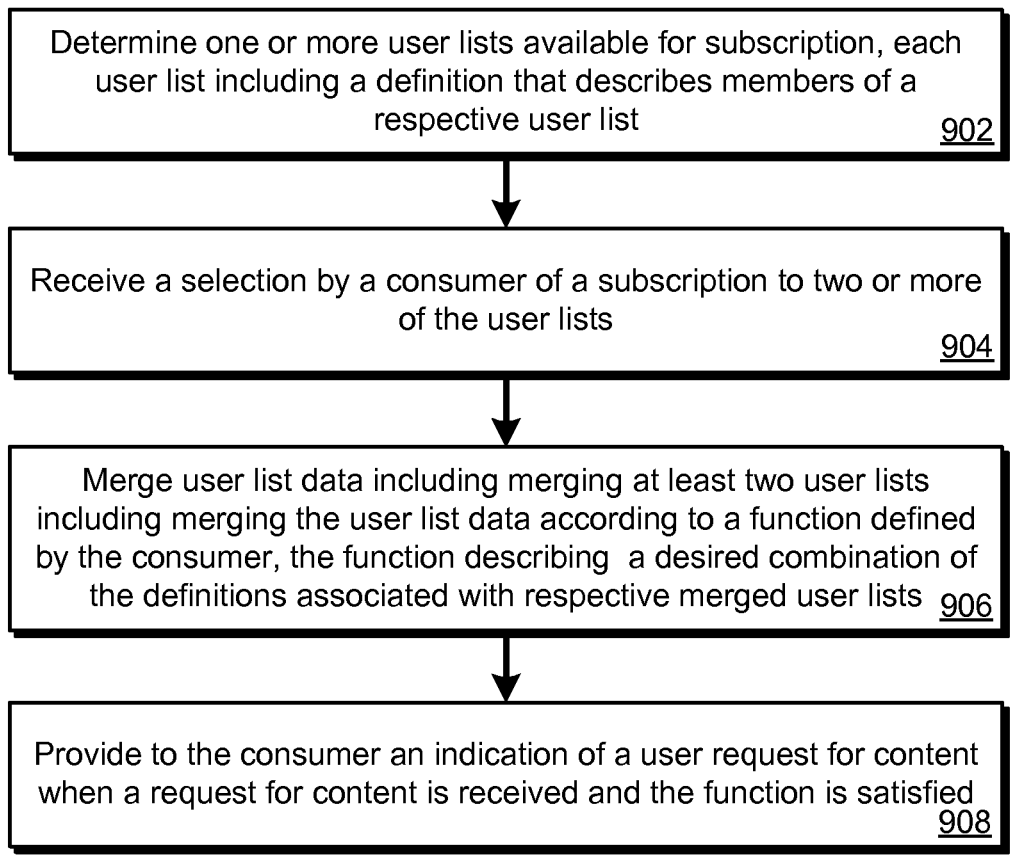
FIG. 9 is a flow diagram of an example process for receiving a subscription from a consumer for a consumer-specified combination of two or more user lists.

FIG. 9 is a flow diagram of an example process 900 for receiving a subscription from a consumer for a consumer-specified combination of two or more user lists. The data exchange engine 102, for example, can perform the process 900. More or fewer participants may be involved.

At stage 902, one or more user lists available for subscription are determined. Each user list includes a definition that describes members of a respective user list. For example, the data exchange engine 102 can generate a list of user lists to which consumers can subscribe, including the Washing Machines user list and the Green Living user list. Using a user interface, the data exchange engine 102 can display these two user lists and other subscription-ready user lists to the consumer. The data exchange engine 102 can also display each user list's definition that characterizes members of each user list.

At stage 904, a selection by a consumer of a subscription to two or more of the user lists is received. For example, using the user interface provided by the data exchange engine 102, a consumer, such as an advertiser, can select two or more of the user lists. The consumer may select the Washing Machines user list and the Green Living user list, for example.

At stage 906, user list data is merged. At least two user lists are merged, including merging the user list data according to a function defined by the consumer. For example, the function (e.g., the Boolean function OR, AND, etc.) describes a desired combination of the respective merged user lists (e.g., merge users who are members of either "Washing Machines" OR "Green Living" or include users who are members of both "Washing Machines" AND "Green Living"). In general, the data exchange engine 102 can merge the Washing Machines user list and the Green Living user list based on the functions (e.g., Boolean and/or other functions) specified by the consumer (e.g., an advertiser). In some implementations, the process of merging the two user lists can leave the source user lists unchanged.

At stage 908, an indication of a user request for content is provided to the consumer when a request for content is received and the function is satisfied. In some implementations, the request for content can be a request to serve an ad, for example, that the data exchange engine 102 receives as a result of a user who is browsing the Internet and navigating to another webpage that includes a slot for advertisement. The data exchange engine 102 can provide the indication of the user request and the satisfied function by notifying the advertiser who created the customized list at stage 906 and who also specified the function used to merge the user lists. The sequence of user actions leading up to the ad request in this example can be similar to those described above for stage 302 of the process 300.

The processes 300-900 described above include example sequences of stages or steps, but any appropriate sequences of steps can be used. Moreover, the processes 300-900 can be used to process requests for content that are not only ads (as described in the examples), but may also include, in some implementations, other webpage content, including, but not limited to, search results, content displayed in web pages, and so on. Similarly, the use of joined user lists can be used for other content other than ads.

Figure 10:
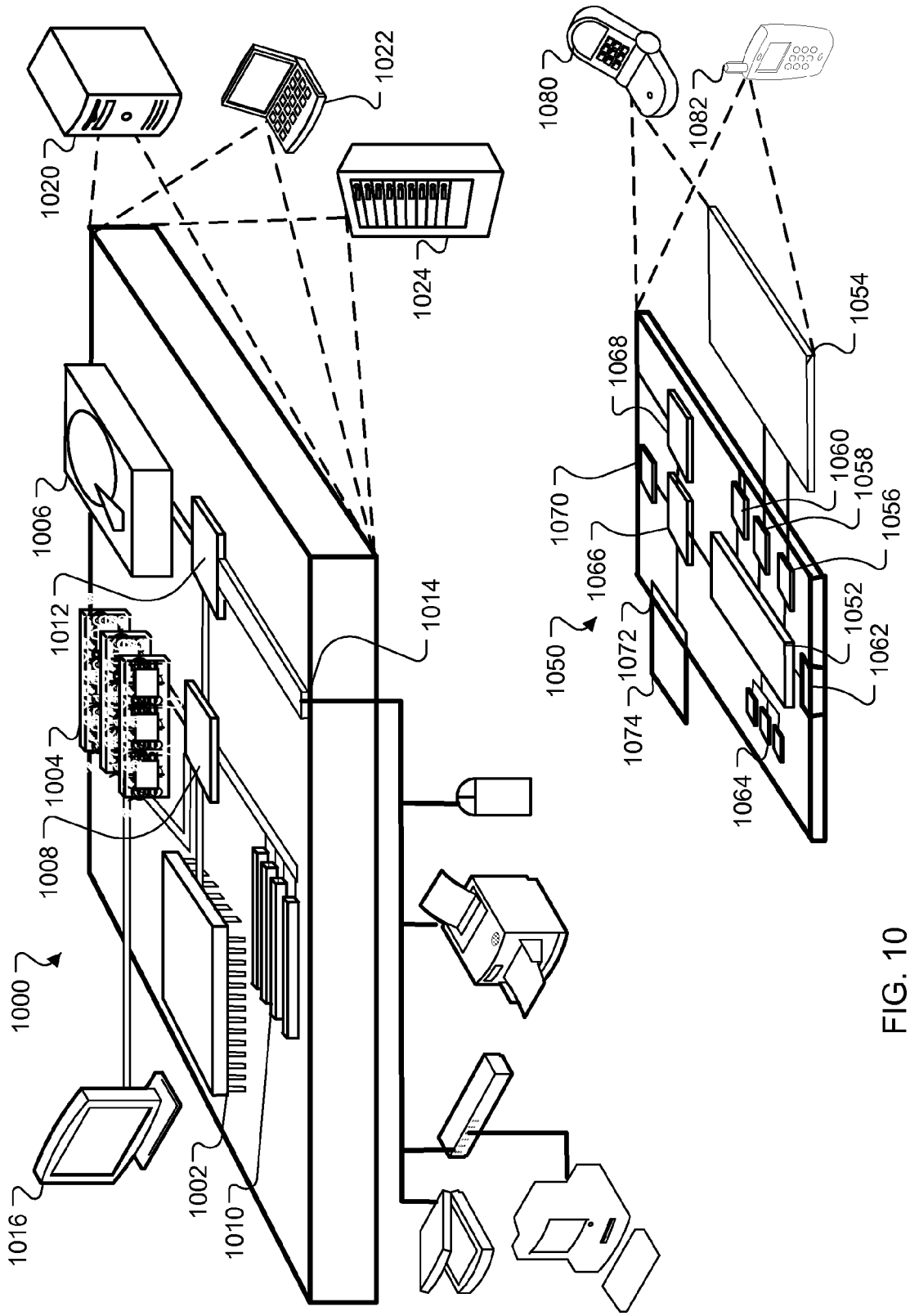
FIG. 10 shows an example of a computer device and a mobile computer device that can be used to implement the techniques described here.

FIG. 10 shows an example of a generic computer device 1000 and a generic mobile computer device 1050 which may be used with the techniques described here. Computing device 1000 is intended to represent various forms of digital computers, such as laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provide in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052 that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to advertisements, but other forms of future, content delivery may also be supported.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
receiving a request for content from a user, the request being a request for an advertisement;
identifying a user associated with the request, the identifying based at least in part on a login or other identifying information provided as part of the request, wherein identifying includes determining a unique identifier that is associated with the user;
determining two or more user lists that are associated with the user, including using the unique identifier to locate the two or more lists, each user list including a definition that characterizes members of a respective user list, wherein the definition specifies a common characteristics shared by each member of a respective user list and wherein a user list is associated with an owner wherein the owner is not a user that is included in the user list;
enabling advertisers to subscribe to user lists including presenting available user lists for subscription and cost information for use of a respective user list, and receiving selections from an advertiser to subscribe to particular ones of the available user lists including a subset of the two or more user lists that are associated with the user, wherein subscription to a user list includes compensating an owner for access to a respective user list, access being at a time when a user request has been received to identify a particular user as having a characteristic that is associated with the respective user list based on knowledge of the owner of the respective user list;
after receiving the request and after enabling the advertiser to subscribe to the particular ones of the available user lists, determining that the advertiser is a subscriber to the subset of the two or more user lists, wherein the subset includes a first user list and a second user list, and wherein subscription to a user list includes compensating an owner for access to a respective user list and wherein the owner is not the advertiser;
determining that the advertiser has indicated a preference to target members that are included in both the first and the second user lists;
evaluating whether the indicated advertiser preference is satisfied by the user's association with the two or more lists; and
providing content associated with the advertiser responsive to the request including compensating owners of the first and second user lists by the advertiser.

2. The method of claim 1 where the request is a request for an ad to be displayed to the user and wherein the advertiser provides customized content to the user.

3. The method of claim 1 wherein the user list comprises the definition and one or more members each identified by user-specific data.

4. The method of claim 3 wherein the user list is stored in a table of user lists and where the user-specific data identifies the user.

5. The method of claim 4 wherein the user-specific data is a global identifier associated with the user in an advertising serving system.

6. The method of claim 1 wherein the user lists are used by the advertiser for adjusting bids in real time.

7. The method of claim 1 where the user lists are used by the advertiser for customizing content to be presented to the user.

8. A computer-implemented method comprising:
enabling advertisers to subscribe to user lists including presenting available user lists for subscription and cost information for use of a respective user list, and receiving selection from an advertiser to subscribe to particular ones of the available user lists, wherein subscription to a user list includes compensating an owner for access to a respective user list, access being at a time when a user request has been received to identify a particular as having a characteristic that is associated with the respective user list based on knowledge of the owner of the respective user list, wherein enabling includes providing a user interface including a presentation of one or more user lists to an advertiser, each user list including a definition that characterizes members of respective user list and cost information for subscription to the respective user list, wherein the definition specifies a common characteristics shared by each member of a respective user list and wherein a user list is associated with an owner and wherein the owner is not a user included in a respective user list;
receiving an indication of a selection of two lists from the user lists, wherein the selection indicates a subscription, by the advertiser, to the selected two or more lists;
receiving an indication of a function for joining the user lists to create a customized list that includes one or more members;
storing the selection and the function for recall when a user provides a request for content, wherein respective owners of the first and second user lists are compensated by the advertiser when content associated with the advertiser is provided responsive to the request; and
using the user list for the benefit of the advertiser when a user request is received from a user included in the lists including evaluating the user request to identify the user, determining that the user is included in one or more of the first and second user lists, determining that the function is satisfied by the user's inclusion in the first and second user lists, and bidding on an opportunity to serve content of the advertiser to a user associated with the user request including compensating owners of both the first and second user lists, wherein the user is identified based on a login or with information included with the user request.

9. The method of claim 8 where the presentation includes a list of user lists and meta data describing each definition.

10. The method of claim 8 wherein the indication of a function is a Boolean AND function.

11. The method of claim 8 wherein the indication of a function is a Boolean NOT function.

12. The method of claim 8 wherein the indication of a function is a Boolean OR function.

13. The method of claim 8 wherein joining the user lists to create a customized list includes using numerical comparisons and functions using information associated with users who are members of the user lists.

14. The method of claim 8 further comprising:
receiving a request for content from a user;
determining the user is a member of one or more of the two user lists;
determining if the function is satisfied; and
providing an indication of the satisfied function along with the request to the advertiser.

15. The method of claim 8 wherein the owners are compensated irrespective of whether the advertiser wins an auction to serve content to the user with a received request.

16. A computer-implemented method comprising:
presenting user lists to an advertiser, each user list including a definition describing members of a respective user list, wherein the definition specifies a common characteristics shared by each member of a respective user list and includes cost information for subscription to the respective user list, wherein a user is associated with an owner, and wherein the owner is not a user included in a respective user list;
receiving, from the advertiser, a selection of at least two user lists for subscription to the selected user lists, wherein a subscription to a user list includes compensating an owner for access to a respective user list, wherein subscription to a user list includes compensating an owner fro access to respective user list, access being at a time when a user request has been received to identify a particular user as having a characteristics that is associated with the respective user list based on knowledge of the owner of the respective user list;
creating a customized list included receiving a definition that is a function that relates the at least two user lists;
storing the customized list including the definition, wherein respective owners of the first and second user lists are compensated by the advertiser when content associated with the advertiser is provided responsive to received requests from the user; and
using the customized list for the benefit of the advertiser when a user request is received from a user included in the first and second lists including evaluating the user request to identify the user, determining that the user is included in the two user lists subscribed to by the advertiser, determining that the function is satisfied by the user's inclusion in the two user lists, and serving content associated with the advertiser based on the determining including compensating owners of both the two user lists, wherein the user is identified based on a login or with information included with the user request.

17. The method of claim 16 where the function is an AND function.

18. The method of claim 16 further comprising:
receiving a request for content from a user;
determining the user is a member of one or more of the at least two user lists;
determining if the function is satisfied; and
providing an indication of the satisfied function along with the request to the advertiser.

19. The method of claim 16 where the function is a Boolean function.

20. A computer-implemented method comprising:
presenting user lists to a advertiser, each user list including a definition describing members of a respective user list, wherein the definition specifies a common characteristic shared by each member of the respective user list and includes cost information for subscription to the respective user list, wherein a user list is associated with an owner, and wherein the owner is not a user included in a respective user list;

receiving, from the advertiser, a selection of at least two user lists for subscription to the selected user lists, wherein a subscription to a user list includes paying a fee to have access to information in the respective user list and wherein at least two of the user lists are associated with different owners, wherein subscription to a user list includes compensating an owner for access to a respective user list, access being at a time when a user request has been received to identify a particular user as having a characteristic that is associated with the respective user list based on knowledge of the owner of the respective user list;

creating a customized list including receiving a definition that is function that relates the at least two user lists;

storing the customized list including the definition such that the customized list is merged with unrelated user list data to create a merged list, wherein the merged list specifies an advertiser-defined combination of characteristics of members of the customized list; and using the merged list for the benefit of the advertiser when a user request is received from a user included in the merged list including evaluating the user request to identify the user, determining that the user is included in the merged list, determining that the function is satisfied by the user's inclusion in the merged list, and serving content associated with the advertiser based on the determining including compensating owners of the at least two user lists, wherein the user is identified based on a login or with information included with the user request.

21. A computer-implemented method comprising:

determining one or more user lists available for subscription, each user list including a definition that describes members of a respective user list, wherein the definition specifies a common characteristic shared by each member of a respective user list and includes cost information for subscription to the respective user list, wherein a user list is associated with an owner, and wherein the owner is not a user included in a respective user list;

receiving, from an advertiser, a selection of a subscription to two or more of the user lists wherein a subscription to a user list includes compensating an owner for access to a respective user list, wherein subscription to a user list includes compensating an owner for access to a respective user list, access being at a time when a use request has been received to identify a particular user as having a characteristic that is associated with the respective user list based on knowledge of the owner of the respective user list;

merging user list data including merging at least two user lists including merging the user list data according to a function defined by the advertiser, the function describing a desired combination of the definitions associated with respective merged user lists; and providing to the advertiser an indication of a user request for content when a request for content is received and the function is satisfied, wherein respective owners of the first and second user lists are compensated by the advertiser and wherein the user associated with the user request is identified based on a login or with information included with a user request.

\* \* \* \* \*